United States Patent
Komatubara et al.

(10) Patent No.: US 7,815,822 B2
(45) Date of Patent: Oct. 19, 2010

(54) FORMING SHEET, LENTICULAR LENS SHEET PRODUCTION METHOD, AND THEIR PRODUCTION APPARATUS

(75) Inventors: Yasuhisa Komatubara, Tainai (JP); Fumikazu Endo, Tainai (JP); Yutaka Aoyama, Tainai (JP); Toshiei Kiriu, Tainai (JP); Youji Ono, Tainai (JP)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 11/909,212

(22) PCT Filed: Mar. 22, 2006

(86) PCT No.: PCT/JP2006/305644
§ 371 (c)(1),
(2), (4) Date: Mar. 31, 2008

(87) PCT Pub. No.: WO2006/101101
PCT Pub. Date: Sep. 28, 2006

(65) Prior Publication Data
US 2009/0057934 A1    Mar. 5, 2009

(30) Foreign Application Priority Data
Mar. 22, 2005    (JP) .............................. 2005-082150

(51) Int. Cl.
*B29D 7/00* (2006.01)
(52) U.S. Cl. ........................ 264/1.34; 264/2.7; 264/284; 264/293
(58) Field of Classification Search ................. 264/2.7, 264/1.34, 284, 293; 425/150
See application file for complete search history.

(56) References Cited

U.S. PATENT DOCUMENTS 5,318,430 A  *  6/1994  Ramm .................... 425/141

FOREIGN PATENT DOCUMENTS

| JP | 1 159627 | 6/1989 |
|---|---|---|
| JP | 01159627 A1 * | 6/1989 |
| JP | 4 163113 | 6/1992 |
| JP | 7 214584 | 8/1995 |
| JP | 2000 35502 | 2/2000 |
| JP | 2002 333307 | 11/2002 |
| JP | 2003 50426 | 2/2003 |

* cited by examiner

*Primary Examiner*—Khanh Nguyen
*Assistant Examiner*—Saeed M Huda
(74) *Attorney, Agent, or Firm*—Oblon, Spivak, McClelland, Maier & Neustadt, L.L.P.

(57) ABSTRACT

A method and an apparatus for producing a pattern forming sheet efficiently. The method and apparatus for producing a sheet having a first pattern formed on at least one side by a first roll forming die and a second pattern formed by a second roll forming die is characterized in that the rotational angular speeds of the first and second roll forming dies are substantially equalized and relative positional variation of the first and second patterns is substantially minimized by synchronizing the phases of the periodic positional variation caused by the rotation of the rolls.

3 Claims, 6 Drawing Sheets

光

(a) POSITIONAL DISPLACEMENT OF ROLL 1

(b) POSITIONAL DISPLACEMENT OF ROLL 2

(c) OPTICAL AXIS DISCREPANCY BETWEEN ROLLS 1 AND 2

(a) POSITIONAL DISPLACEMENT OF ROLL 1

(b) POSITIONAL DISPLACEMENT OF ROLL 2

(c) OPTICAL AXIS DISCREPANCY BETWEEN ROLLS 1 AND 2 (CASE 1)

(d) OPTICAL AXIS DISCREPANCY BETWEEN ROLLS 1 AND 2 (CASE 2)

(a) OPTICAL AXIS DISCREPANCY PROFILE IN EXAMPLE (b) OPTICAL AXIS DISCREPANCY PROFILE IN EXAMPLE (PARTIALLY MAGNIFIED VIEW)

FORMING SHEET, LENTICULAR LENS SHEET PRODUCTION METHOD, AND THEIR PRODUCTION APPARATUS

TECHNICAL FIELD

The present invention relates to a method and apparatus for producing sheets with plural patterns formed thereon, in particular a method and apparatus for producing optical sheets for use in rear projection televisions.

BACKGROUND ART

In the art, translucent screens are generally used in rear projection televisions. An example of the constitution of such translucent screen is shown in the schematic cross-sectional view given in FIG. 3. In FIG. 3, 1 is a Fresnel lens sheet and 2 is a lenticular lens sheet. Generally, a translucent screen is constituted of these Fresnel lens sheet 1 and lenticular lens sheet 2 in close contact with each other. The incidence side, exit side, incidence surface and exit surface, so referred to hereinafter, respectively indicate the incidence side, exit side, incidence surface and exit surface of the translucent screen to be irradiated with light for image display thereon as shown in FIG. 4.

An example of the constitution of a lenticular lens sheet 2 is shown in the cross-sectional view given in FIG. 4. As shown in FIG. 4, on the light incidence side of the lenticular lens sheet 2, there are generally arranged plural incidence side lenses 21 having a roughly semicylindrical cross section. These plural incidence side lenses 21 are formed so that the lens troughs 22 are found at regular intervals. The parallel rays or convergent rays transmitted through and allowed to exit from the Fresnel lens sheet 1 are diffused widely in the horizontal direction. By this, it becomes possible for an observer to observe an image in a wide visual field in the horizontal direction.

As shown in FIG. 4, plural exit side lenses 23 are arranged on the light exit side of the lenticular lens sheet 2. Among these plural exit side lenses 23, a light absorbing layer 3 made of a light absorbing material such as black ink is disposed. This light absorbing layer 3 covers a region (non-light-condensing region 4) other than light-condensing parts of respective incidence side lenses 21 disposed on the light incidence surface side. Thus, the light absorbing layer 3 is disposed on the light exit side so that the contrast in a light room may be improved. Further, in FIG. 4, boundary portions 31 of the light absorbing layer 3 are disposed on the slanting surfaces 41 of the non-light-condensing region 4.

In a lenticular lens sheet 2 for a projection type image display having plural image light sources, the light-condensing parts on the light incidence surface are sometimes provided with other lenses for the purpose of avoiding color irregularities. In the following, the light incidence surface is sometimes referred to also as "HL surface", and the light absorbing layer 3 as "black stripes" or "BS".

In the lenticular lens sheet 2 as such, the relative position between the position of each incidence side lens 21 disposed on the light incidence surface side and the light absorbing layer 3 or between the position of each incidence side lens 21 on the light incidence surface and each exit side lens 23 is important. More specifically, if the light absorbing layer 3 partly covers the light condensing site of an incidence side lens 21 on the light incidence surface side, the transmitted rays are partly blocked and the transmission efficiency may be reduced or the intended exit pattern may not be obtained (cf. Patent Document 1).

Further, if an incidence side lens 21 on the light incidence surface side and the corresponding exit side lens 23 are not in the intended positional relationship, problems will arise; the intended exit pattern may not be obtained or the color irregularity may not be reduced to a satisfactory extent. It is therefore necessary to precisely adjust the positions of the incidence side lenses 21 on the light incidence surface, the exit side lenses 23 and the light absorbing layer 3.

In recent years, in particular, the lenticular lens sheets 2 have been demanded to be higher definition ones and, therefore, it is necessary to make the pitches finer. For example, the pitches in the past were about 0.7 to 1.0 mm and the relative positional misalignment between the lenses and light absorbing layer (hereinafter sometimes referred to also as "optical axis discrepancy") was within ±10 µm and such accuracy was sufficient. In recent years, however, 0.5-mm or finer pitches have been used and, as for the optical axis discrepancy, accuracies better than ±5 µm have been demanded.

The conventional extrusion molding of a thermo-plastic resin using roll molds or the so-called 2P molding using an ultraviolet-curable resin allows the occurrence of periodic positional misalignments of ±2 to 3 µm in the direction parallel to the axis in view of the performance characteristics of roll-supporting bearings, among others. When the above-mentioned lenticular lens is produced on the conventional production apparatus, the above-mentioned periodic positional misalignment arises between the roll for forming one side of the sheet and the roll for forming the opposite side and the accuracy is about ±5 µm in terms of positional misalignment or optical axis discrepancy between the front and reverse sides.

Patent Document 1: Japanese Kokai Publication H05-150371

DISCLOSURE OF INVENTION

Problems to be Solved by the Invention

As described above, the prior art methods of producing lenticular lens sheets each has its limits in making more accurate the optical axis alignment performance characteristics of the incidence side lenses on the light incidence surface and the exit side lenses.

The present invention, which has been made in view of the problems discussed above, has for its object to provide an apparatus and method for producing an optical sheet.

Means for Solving Problems

The invention according to Claim 1 is a method of producing a sheet having a first pattern formed on at least one side thereof by a first roll forming die and a second pattern formed by a second roll forming die characterized in that the rotational angular speeds of the first and second roll forming dies are substantially equalized and that the relative positional variation of the first and second patterns is substantially minimized by synchronizing the phases of the periodic positional variation caused by the rotation of the rolls.

The invention according to Claim 2 is the method of producing a sheet according to Claim 1 which is characterized in that a diameter $\phi 1$ of the first roll forming die, a diameter $\phi 2$ of the second roll forming die, the peripheral rotational speed $S1$ of the first roll forming die and the peripheral rotational speed $S2$ of the second roll forming die satisfy the relations $\phi 1 < \phi 2$ and $S1 < S2$.

Further, the invention according to Claim 3 is the method of producing a lenticular lens sheet according to Claim 1 or 2 characterized in that the patterned sheet is a lenticular lens sheet.

On the other hand, the invention according to Claim 4 is an apparatus for producing a patterned sheet comprising resin feeding means, resin melting and extruding means, a die, first and second roll forming dies constituting at least one roll forming die pair and sheet transfer means characterized in that it comprises means for detecting a relative positional discrepancy between patterns formed on both sides of the patterned sheet and that the first and/or second roll forming die is provided with rotational angular speed adjusting means for adjusting the settings of the rotational phases of the first and second roll forming dies, based on the information concerning the relative positional discrepancy detected by the relative positional discrepancy detecting means, so that the amplitude of the variation in the amount of the relative positional discrepancy may be minimized.

Further, the invention according to Claim 5 is the apparatus for producing a lenticular lens sheet according to Claim 4 characterized in that the patterned sheet is a lenticular lens sheet.

EFFECTS OF THE INVENTION

According to the present invention, a method by which a sheet with two or more patterns formed in alignment with each other, in particular a lenticular lens sheet, can be produced with great efficiency as well as an apparatus for producing such lenticular sheet can be provided.

EXPLANATION OF SYMBOLS

1: Fresnel lens sheet, 2: lenticular lens sheet, 21: incidence side lens, 22: lens trough, 23: exit side lens, 3: light absorbing layer, 31: boundary portion, 4: non-light-condensing region, 10: production apparatus, 111, 112: illuminating devices, 12, 13: photographing devices, 121, 131: cameras, 122, 132: taking lenses, 14: image evaluation apparatus, 15: camera monitor, 16: rotational angular speed controlling device.

BEST MODES FOR CARRYING OUT THE INVENTION

Figure 4:
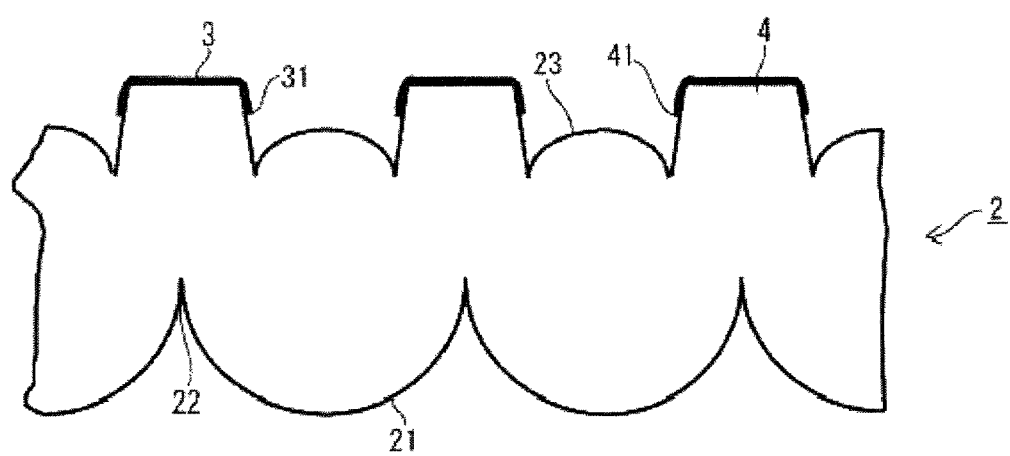
FIG. 4 A schematic sectional view illustrating the constitution of an example of lenticular lens sheet.

The method and apparatus of the invention for producing a patterned sheet can be used in producing optical sheets for use in rear projection televisions, for instance, and, in particular, can be suitably used in producing lenticular lens sheets. This mode of practice includes, but it not limited to, the above-mentioned lenticular lens sheet 2 as an optical sheet, which is described here, referring from time to time to FIG. 4.

In the following, the modes of occurrence of optical axis discrepancies in a conventional production apparatus and the effects of the present invention are described, referring to the drawings.

Figure 2:
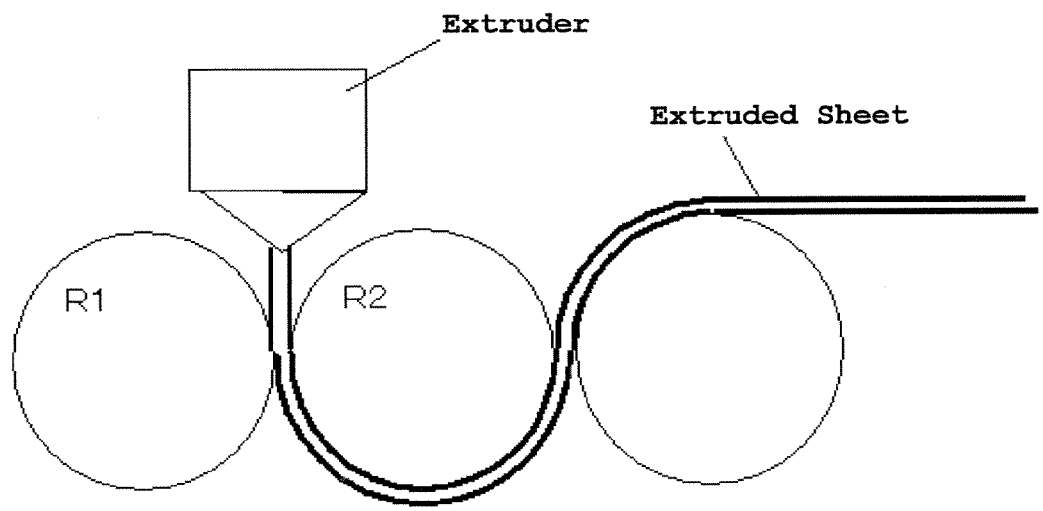
FIG. 2 A schematic representation of an example of the optical sheet production apparatus according to the invention.
Figure 3:
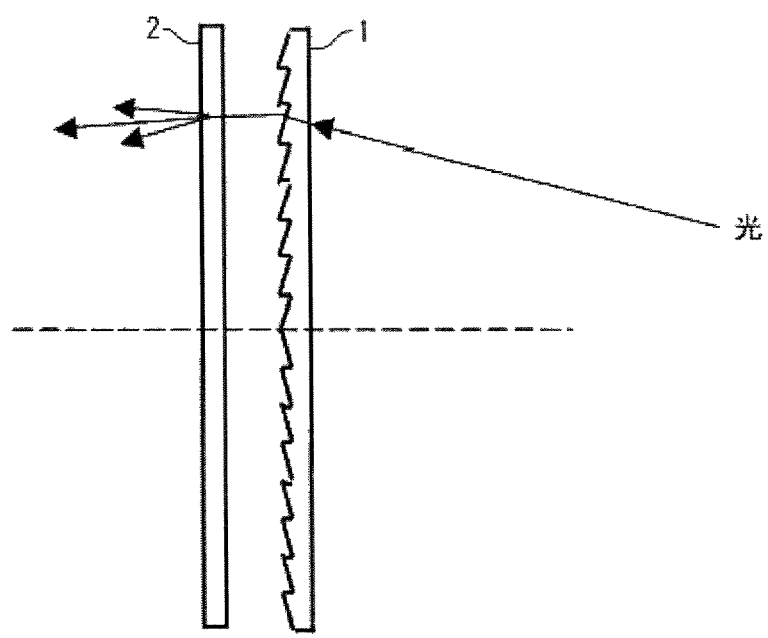
FIG. 3 A schematic sectional view illustrating the constitution of an example of translucent screen.
Figure 6:
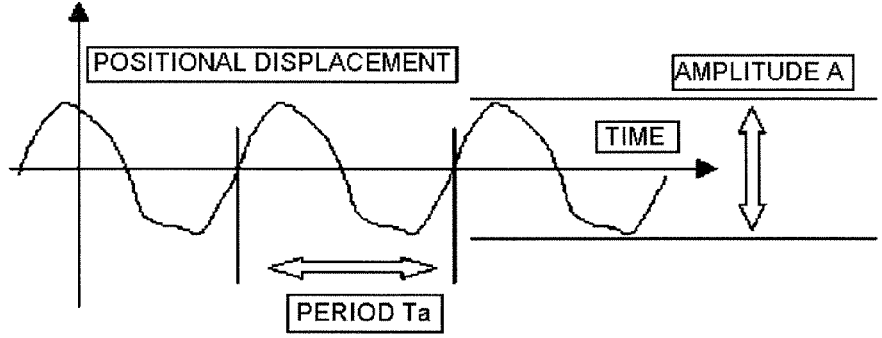
FIG. 6 Illustration of the optical axis discrepancies in another prior art production apparatus and the effects of the present invention.
Figure 6:
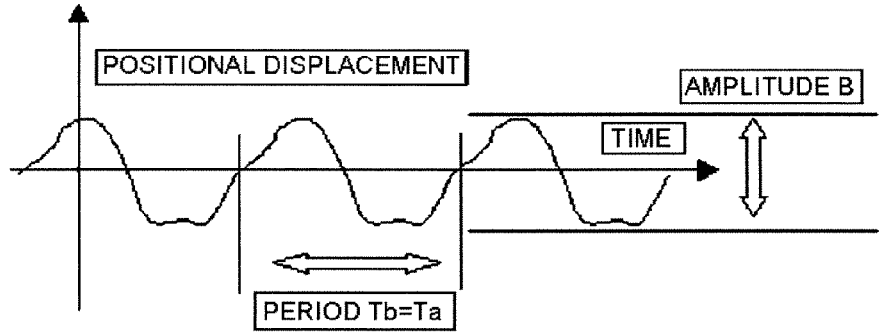
Figure 6:
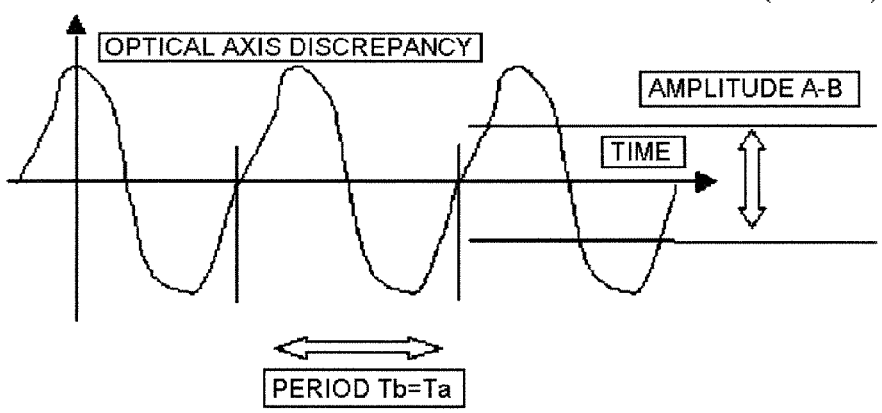
Figure 6:
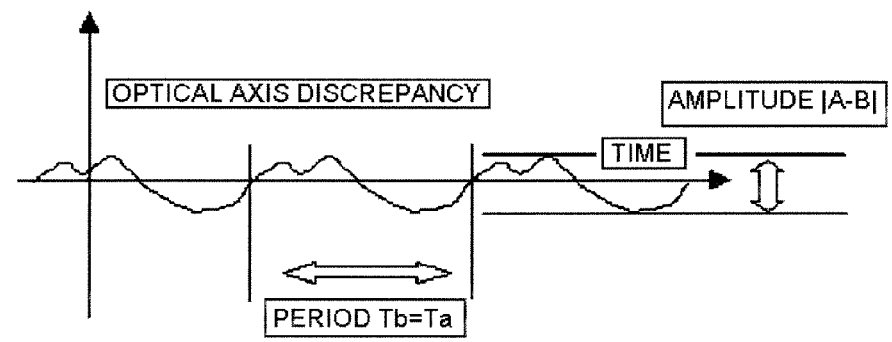

The profiles of optical axis discrepancies in the lenticular lens sheets produced on such an optical sheet extrusion production apparatus as shown in FIG. 2 using roll forming dies R1 and R2 (hereinafter sometimes referred to as "R1" or "R2" for short) identical in roll diameter and rotated at the same rotational angular speed are shown in FIG. 6(a) and FIG. 6(b), respectively. The roll forming dies R1 and R2, so referred to herein, mean a first roll forming die and another (a second) roll forming die mounted on the molding apparatus but do not always mean the roll forming die with which the sheet first came into contact in the direction of the molded sheet and the mold forming die with which the sheet next came into contact.

The roll forming dies are generally supported by bearing members. Due to the size and accuracy of these bearing members, among others, the roll forming dies, while rotating, experience periodic positional displacements in the direction parallel to the axis of rotation. Even in the case of bearing members of high accuracy class, namely class 5 to 4, the accuracy rating is 5 to 4 μm and periodic positional displacements of several micrometers are found, as shown in FIG. 6(a) and FIG. 6(b). The period of the periodic displacements is equal to the length of the molded sheet formed during one revolution of the roll forming die.

The state resulting from the rotations of R1 and R2 at the positions corresponding to the respective maximum amplitudes is the case 1 shown in FIG. 6(c). The optical axis discrepancy arrives at the maximum amplitude (A+B). On the other hand, the state resulting from the rotations of R1 at the maximum amplitude position and of R2 at the minimum amplitude position is the case 2 shown in FIG. 6(d).

According to the invention, paying attention to this, the phases of rotation of R1 and R2 are adjusted to such phases that the optical axis discrepancy becomes minimum so that the positional displacement amplitudes of the roll forming dies R1 and R2 may cancel each other and the rotational angular speeds are substantially equalized so that their phases may be fixed at the phases mentioned above.

Figure 5:
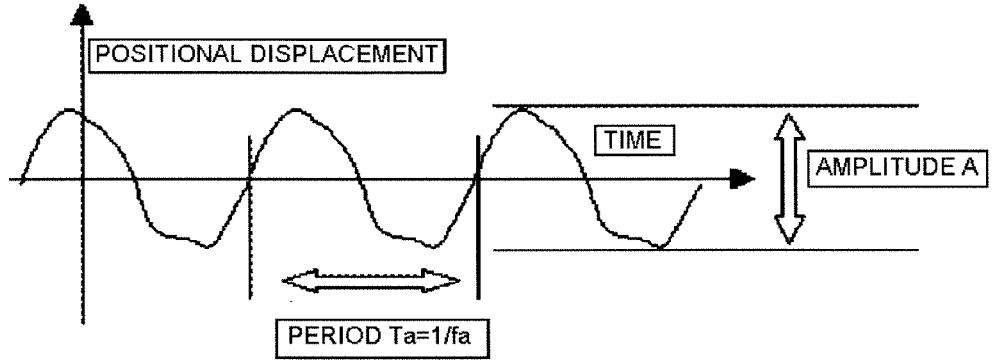
FIG. 5 Illustration of the optical axis discrepancies in a prior art production apparatus and the effects of the present invention.
Figure 5:
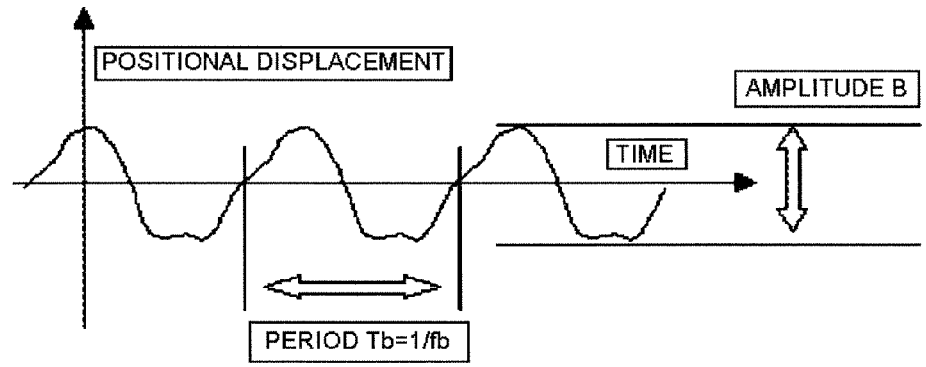
Figure 5:
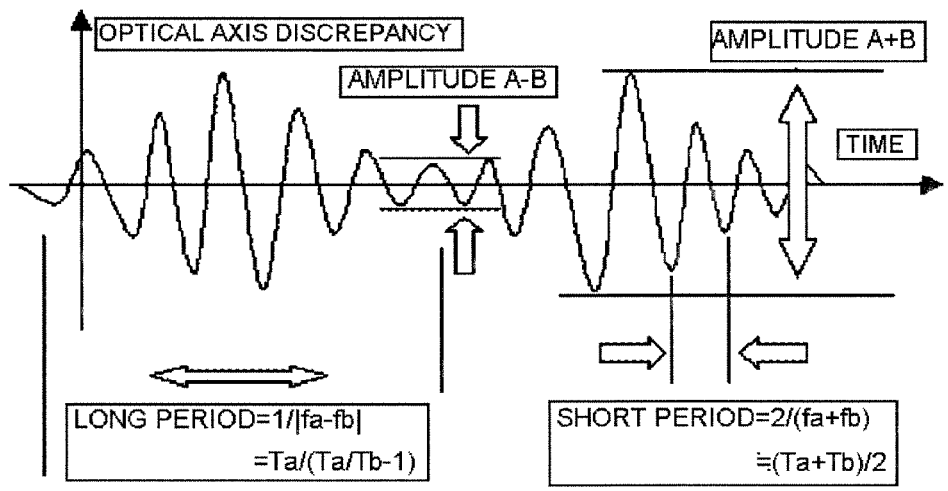

Now, the profiles of optical axis discrepancies in the lenticular lens sheets produced on such an optical sheet extrusion production apparatus as shown in FIG. 2 using roll forming dies R1 and R2 identical in roll diameter but rotated at rotational angular speeds somewhat differing between R1 and R2, hence at different peripheral speeds, are shown in FIG. 5(a) and FIG. 5(b), respectively.

As for the reason why a small difference is given between the peripheral speeds of R1 and R2, it is a common practice, in such a roll forming apparatus as shown in FIG. 2, to make a difference between the peripheral speeds of R1 and R2 for the purpose of applying tension to the sheet or by providing a resin pool (hereinafter sometimes referred to also as "bank") at the site of contact between rolls and resin for the purpose of adjusting the transferability and adhesion to each roll forming die and the mold release properties (hereinafter the difference in peripheral speed between R1 and R2 as expressed in percentage is sometimes referred to as "draw ratio").

However, as shown in FIG. 5(a) and FIG. 5(b), a slight difference in peripheral speed between R1 and R2 in the combination of R1 and R2 identical in roll diameter results in optical axis discrepancies showing the phenomenon of "beat" resulting from overlapping of a relatively short first period and a relatively long second period, as shown in FIG. 5(c).

Thus, when R1 develops positional variations with an amplitude of A and a period of Ta, as shown in FIG. 5(a), and R2 develops positional variations with an amplitude of B and a period of Tb, the relative positional discrepancy, namely optical axis discrepancy, between R1 and R2 periodically varies with a maximum amplitude of (A+B) and a minimum amplitude of |A−B|.

According to the invention according to Claim 2, paying attention to this fact, the rotational angular speeds on the occasion of molding with a slight difference in peripheral speed between R1 and R2 are substantially equalized and the optical axis discrepancy is reduced to the minimum amplitude, as shown in FIG. 6(d), by varying the roll diameters mutually to an extent substantially corresponding to the draw ratio.

Even when the rotational angular speeds of R1 and R2 are not strictly identical, the desired effect can be produced. When the difference in rotational angular speed is slight, the period of beat becomes very long, so that roll phase readjustments can be made at the time when the optical axis discrepancy becomes relatively large. In the practice of the invention, which of R1 and R2 is higher in peripheral speed does not matter. In extrusion molding, for instance, the draw ratio between R1 and R2 is about 1% to 10%.

The apparatus of the invention for producing a patterned sheet is equipped with a means for detecting the relative positional discrepancy between the formed patterns on the patterned sheet at timed intervals or continuously in the direction of flow of molding, and R1 and/or R2 is provided with a rotational angular speed adjusting means for adjusting the settings of the rotational phases of R1 and R2, based on the information concerning the relative positional discrepancy detected, so that the amplitude of the variation in the amount of the relative positional discrepancy may be minimized. More preferably, the information concerning the relative positional discrepancy is further fed back to the axial position adjusting means for R1 or R2 for automatic control.

Figure 1:
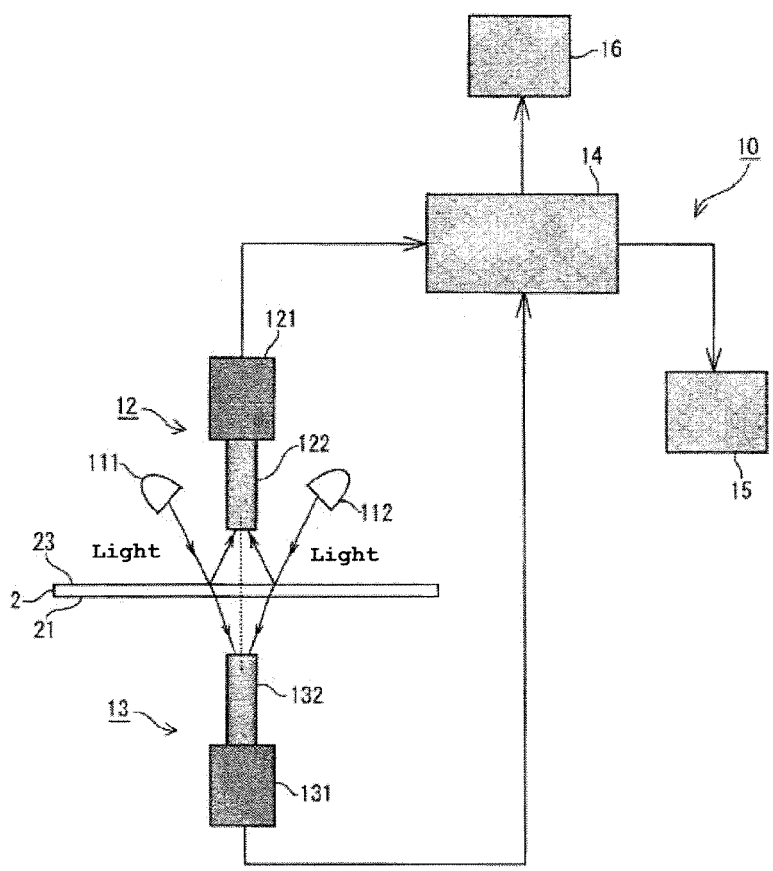
FIG. 1 A schematic representation of the constitution of an example of optical sheet optical axis measuring equipment which is preferably used.

In the schematic figure shown in FIG. 1, there is shown as an example of the present invention, in which the patterned sheet is a lenticular lens sheet, a constitutional example of the optical axis discrepancy measuring apparatus for a lenticular lens sheet. In FIG. 1, a lenticular lens sheet production apparatus according to the invention as a whole is indicated by the symbol 10 (hereinafter this is referred to as "production apparatus 10" for short).

As shown in FIG. 1, the production apparatus 10 is constituted of illuminating devices 111, 112, photo-graphing devices 12, 13, an image evaluation apparatus 14 and a camera monitor 15.

The illuminating devices 111, 112 are devices for irradiating the lenticular lens sheet 2 with illuminating rays. Preferred as the illuminating devices 111, 112 are coaxial vertical illuminators since they are hardly influenced by external light.

The photographing devices 12, 13 are devices for photographing the lenticular lens sheet 2 illuminated by the illuminating devices 111, 112. The photographing devices 12, 13 respectively comprise cameras 121, 131 and taking lenses 122, 132. In FIG. 1, the photographing device 12 is disposed above the lenticular lens sheet 2 and the photographing device 13 below the lenticular lens sheet 2, and these photographing devices 12, 13 take photographs of the lenticular lens sheet 2 from both the light incidence side and exit side. The cameras 121, 131 of the photographing devices 12, 13 are preferably CCD (Charge Coupled Device) cameras. By use of CCD cameras as the cameras 121, 131, the analytical processing in the image evaluation apparatus becomes easy and particular effects can be produced. As for the taking lenses 122, 132 of the photographing devices 12, 13, it is preferred that a coaxial vertical illumination-adapted lens be used on one side and a straight type lens on the other side. By doing so, the contrast of the boundary portion and vertex as provided by reflected rays and transmitted rays can be improved. Further, telecentric lenses are preferred as the taking lenses 122, 132 from the resolving power and depth of focus viewpoint. The photographing devices 12, 13 are disposed in a condition such that these taking lenses 122, 132 have a common central axis.

The image evaluation apparatus 14 is an apparatus determining the relative positions of the lenses 21, 23 by analytical processing of the images photographed by the photographing devices 12, 13.

The camera monitor 15 is a CRT or liquid display or the like and is a display means for displaying the images photographed by the photographing devices 12, 13 and the evaluation results, among others, obtained by the image evaluation apparatus 14.

As shown in FIG. 1, this production apparatus 10 is connected with a rotational angular speed controlling device 16 for the rolls. This roll rotational angular speed controlling device 16 can control the rotational phases of the rolls by controlling the rotational angular speeds of the rolls used in forming the lenticular lens sheet 2 by extrusion molding, for instance.

Now, the operating process of the production apparatus 10 is described.

The illuminating devices 111, 112 irradiate the lenticular lens sheet with illuminating rays from the light exit side (BS surface side). In this state, the lenses 21, 23 on the front surface and reverse surface of the lenticular lens sheet 2 are photographed respectively by the cameras 121, 131 of the photographing devices 12, 13 whose central axes are in common. Here, the surface disposed on top on the occasion of production by the production apparatus 10, namely the surface on the side of the photographing device 12, is referred to as the front surface of the lenticular lens sheet 2. Further, the surface disposed at the bottom on the occasion of production by the production apparatus 10, namely the surface on the side of the photographing device 13, is referred to as the reverse surface of the lenticular lens sheet 2.

The unit photographing time of the photographing devices 12, 13 is preferably within the range of 0.1 second to 0.0001 second. If the unit photographing time of the photographing devices 12, 13 is longer than 0.1 second, the photographic object (lenticular lens sheet 2) and/or the photographing devices 12, 13 may be vibrated by ambient vibration sources and, therefore, the images may become blurry and the boundary contrast may become lowered, possibly leading to increased measurement errors. Further, when the unit photographing time of the photographing devices 12, 13 is shorter than 0.0001 second, the photographic sensitivity is insufficient and the contrast decreases as well, possibly leading to increased measurement errors. A more preferred range of the unit photographing time is 0.01 second to 0.0002 second, and a still more preferred range is 0.02 second to 0.0005 second.

The photographing devices 12, 13 take photographs while moving relative to the lenticular lens sheet 2 in the lengthwise direction of the lens (in the longitudinal direction of the lenticular lens sheet 2). The range of this lengthwise direction of the lens for judging changes in luminance is preferably 0.5 to 10 times the lens pitch. When this range is shorter than 0.5-fold, the variation resulting from the lens width and/or position molding accuracy cannot be leveled, possibly resulting in increased errors. Further, that the range in question is longer than 10 times the pitch means that the field of view in photographing is enlarged, namely that the magnification in photographing is low, hence the precision of measured values may become poor in certain instances.

The image evaluation apparatus 14 determines the position of the exit side lens 23 by analytical processing of the image photographed. More specifically, the image evaluation apparatus 14 analyzes the luminance value of the boundary portion 31 of the light absorbing layer 3 out of the image of the BS surface photographed by the camera 121 of the photographing device 12. By doing so, the image evaluation apparatus 14 detects the boundary portion 31 of the light absorbing layer and measures the position of the exit side lens 23.

Comparison of the thus-obtained positions of the exit side lens 23 and light absorbing layer 3 on the BS side with the position of the incidence side lens 21 on the HL side makes it possible to determine the relative positions of the incidence side lens 21 on the light incidence side and the exit side lens 23. Based on this measurement result, the roll position controlling device 16 positionally control the pattern forming rolls and thus can be used for adjusting the positions of the lenses 21, 23.

The method of measuring the positions of the lenses 21, 23 is not limited to the method mentioned above and may be any method capable of grasping a change in reflected or transmitted light-due luminance, as detected in response to a surface or inner structure, as a position of the surface structure or inner structure. It is also possible to use plural cameras in each of the photographing devices 12, 13, or provide illuminating means above and under the lenticular lens sheet 2 and choose these illuminating means alternately to thereby cause one camera to perform photographing functions substantially of plural cameras.

Further, it is only necessary that the photo-graphing devices 12, 13 separately take photographs of the lenses 21, 23; the correspondence relation between the lenses to be photographed is not particularly restricted.

By use of such an apparatus for measuring optical axis discrepancies in an optical sheet as mentioned above, it is possible to efficiently adjust the rotational phases of the roll 1 and roll 2, as mentioned below.

First, the optical axis discrepancy profile shown in FIG. 5(c) is reproduced by causing a difference of several percent between the rotational angular speeds of the roll 1 and roll 2. This optical axis discrepancy state is observed over 2 to 3 long periods using the above-mentioned device for measuring optical axis discrepancies in optical sheets. By finding out the positions and timing for minimizing the optical axis discrepancy based on the thus-obtained optical axis measurement results and substantially equalizing the rotational angular speeds of the roll 1 and roll 2 at those roll rotation phases, it becomes possible to realize an optical axis discrepancy state in which the amplitude is lowest, as shown in FIG. 6(d).

In the foregoing, an apparatus for transferring a first optical pattern to one surface of a transparent sheet and transferring another optical pattern to the opposite surface thereof has been described. The present invention, however, is not limited to such apparatus. Thus, for example, the present invention also includes a method and apparatus for producing a sheet provided with a second pattern formed on a first pattern already formed on the surface of a transparent sheet on the same side in phase with each other. Further, it includes a method and apparatus for producing a sheet carrying a pattern formed inside a transparent sheet. It also includes a method and apparatus for producing a sheet comprising three or more patterns formed.

EXAMPLES

The following example, together with a comparative example, illustrates the present example specifically.

Example

A 0.5-mm-pitch lenticular lens sheet 2 was continuously produced for 24 hours by the extrusion molding method using an acrylic-styrene copolymer resin. Principal production conditions are shown in Table 1.

TABLE 1

Principal specifications of the production apparatus used in the example

|    | Roll diameter (mm φ) | Number of revolutions (rpm) | Roll peripheral speed (m/min) | Draw ratio |
|----|----------------------|------------------------------|-------------------------------|------------|
| R1 | 400.00               | 4.3768                       | 5.500                         | (reference) |
| R2 | 415.40               | 4.3768                       | 5.712                         | 3.85%      |

On the occasion of this production, the light incidence surface and light exit surface were detected behind the extrusion molding apparatus using a photographing system having such a constitution as shown in FIG. 1 and the information concerning the relative positions of the incidence side lens 21 on the light incidence surface and the exit side lens 23 as obtained by an image evaluation apparatus 14 was input into a rotational angular speed controlling device to thereby control the rotational phases of the roll forming dies. Simultaneously, the above-mentioned relative position information was output for optical axis discrepancy evaluation.

Figure 7:
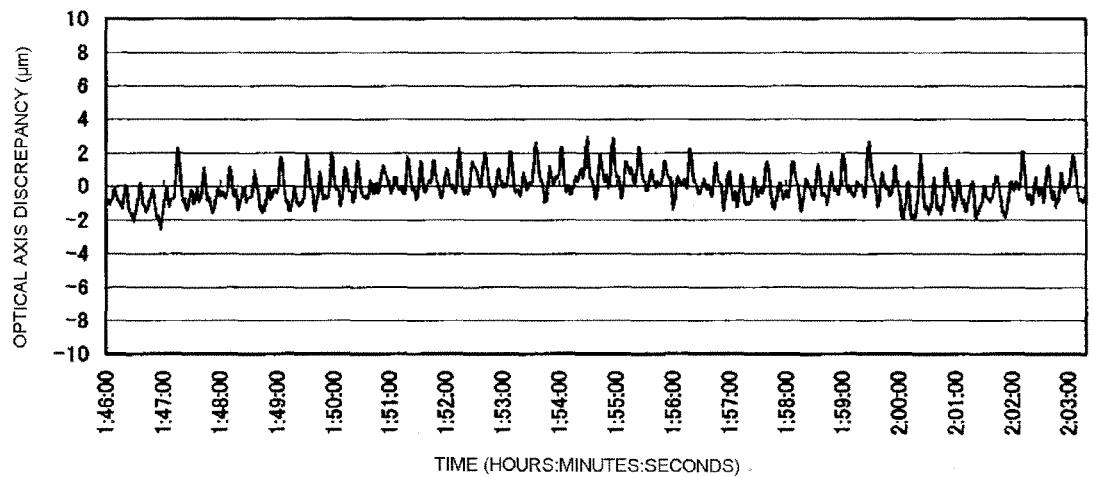
FIG. 7 Results of optical axis measurement for an optical sheet produced on the production apparatus described in the example.
Figure 7:
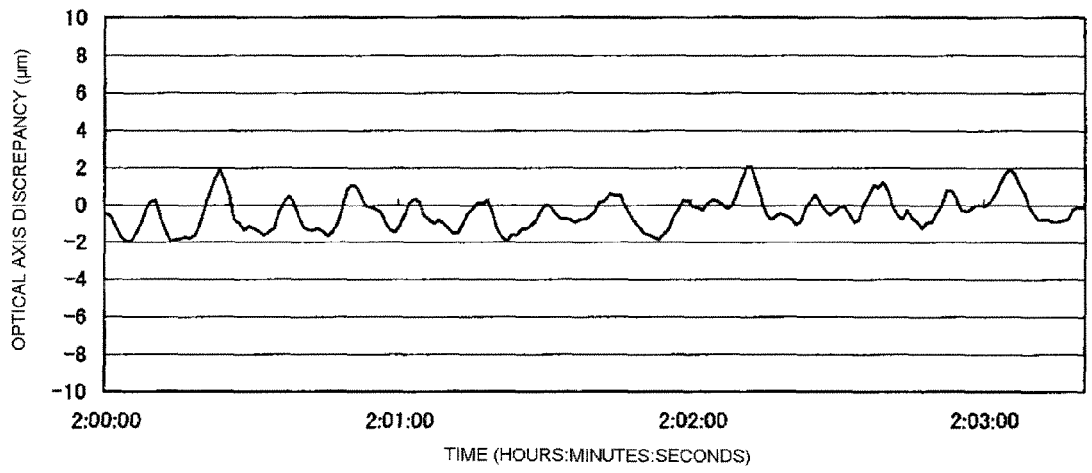

As a result, the optical axis discrepancy was within the range of ±3 μm over the whole period of operation. Such state is partly shown in FIG. 7.

Comparative Example

A lenticular lens sheet was produced continuously for 24 hours in the same manner as in the above example except that the rolls R1 and R2 were identical in diameter and that the draw ratio was adjusted by changing the number of revolution of R2 and no rotational phase control was exercised.

TABLE 2

Principal specifications of the production apparatus used in the comparative example

|    | Roll diameter (mm φ) | Number of revolutions (rpm) | Roll peripheral speed (m/min) | Draw ratio |
|----|----------------------|------------------------------|-------------------------------|------------|
| R1 | 400.00               | 4.3768                       | 5.500                         | (reference) |
| R2 | 400.00               | 4.5453                       | 5.712                         | 3.85%      |

Figure 8:
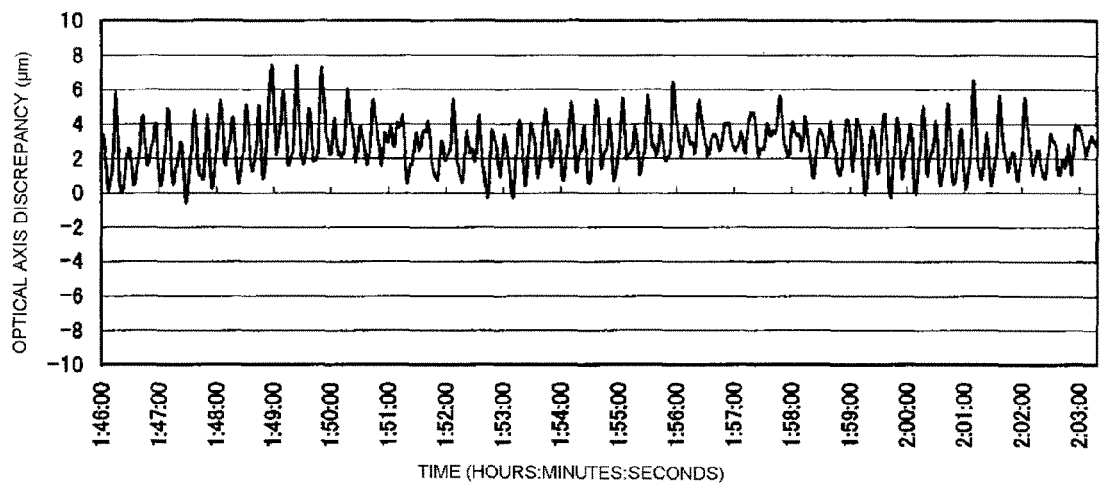
FIG. 8 Results of optical axis measurement for an optical sheet produced on the production apparatus described in the comparative example.
Figure 8:
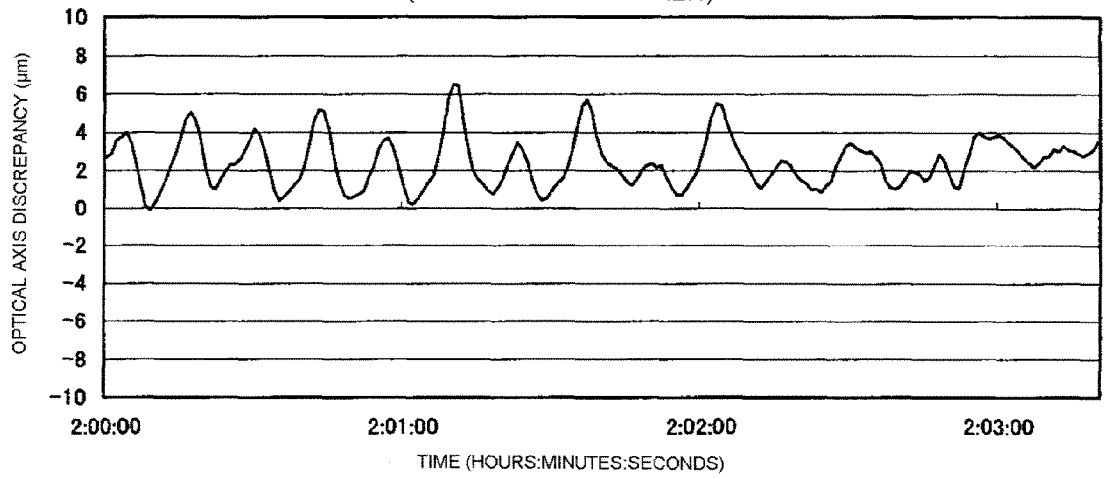

As a result, the optical axis discrepancy became great at intervals of several minutes, and the optical axis discrepancies were within the range of ±7 μm at the maximum. Such state is partly shown in FIG. 8. As a result, the percentage of acceptable products with the optical axis discrepancy being within ±5 μm was about 70%. The separation of products acceptable from the optical axis discrepancy viewpoint from unacceptable products was very troublesome and the workability was very poor.

The invention claimed is:

1. A method of producing a sheet having a first pattern formed on at least one side of the sheet by a first roll forming die and a second pattern formed on the sheet by a second roll forming die, the method comprising:

equalizing, substantially, rotational angular speeds of the first and second roll forming dies; and minimizing, substantially, a relative positional variation between the first and second patterns by synchronizing phases of a periodic positional variation between each of the first and second roll forming dies and the sheet along an axis parallel to a rotational axis of the first and second roll forming dies caused by the rotation of the first and second roll forming dies.

2. The method of producing a sheet according to claim 1, wherein a diameter $\phi 1$ of the first roll forming die, a diameter $\phi 2$ of the second roll forming die, a peripheral rotational speed S1 of the first roll forming die and a peripheral rotational speed S2 of the second roll forming die satisfy the relations $\phi 1 < \phi 2$ and S1<S2.

3. The method of producing a sheet according to claim 1, wherein the sheet is a lenticular lens sheet.

* * * * *